United States Patent [19]

Kato et al.

[11] Patent Number: 4,918,134

[45] Date of Patent: Apr. 17, 1990

[54] PROCESS FOR PARTIALLY CURING POLYARYLENE SULFIDES

[75] Inventors: Toshikazu Kato; Hiroshi Inoue; Noriaki Emura, all of Yokkaichi, Japan

[73] Assignees: Tosoh Corporation, Yamguchi; Toso Susteel Co., Ltd., Tokyo, both of Japan

[21] Appl. No.: 318,797

[22] Filed: Mar. 3, 1989

Related U.S. Application Data

[63] Continuation of Ser. No. 125,417, Nov. 25, 1987, abandoned.

[30] Foreign Application Priority Data

Nov. 27, 1986 [JP] Japan .............................. 61-280894

[51] Int. Cl.$^4$ ................................................. C08K 3/36
[52] U.S. Cl. ..................................... 524/609; 524/425; 524/451; 528/481; 528/503
[58] Field of Search .................. 524/609, 425, 451; 528/481, 503

[56] References Cited

U.S. PATENT DOCUMENTS

| | | |
|---|---|---|
| 3,354,129 | 11/1967 | Edmonds et al. |
| 3,524,835 | 8/1970 | Edmonds et al. |
| 3,562,199 | 2/1971 | Hill, Jr. et al. ............ 524/609 |
| 3,592,783 | 7/1971 | Edmonds ................... 524/609 |
| 3,717,620 | 2/1973 | Rohlfing . |
| 3,894,983 | 7/1975 | Higbee ....................... 524/451 |
| 4,274,993 | 6/1981 | Narisawa et al. ........... 524/609 |
| 4,711,796 | 12/1987 | Yu et al. ..................... 524/425 |

*Primary Examiner*—Theodore E. Pertilla
*Assistant Examiner*—David W. Woodward
*Attorney, Agent, or Firm*—Sughrue, Mion, Zinn, Macpeak & Seas

[57] ABSTRACT

In a process for partially curing a powdery polyarylene sulfide resin which comprises heating the powdery resin either in the absence or presence of oxygen while agitating so as to attain an increased melt viscosity in a range suitable for further processing or molding of the resin, an improvement comprising that the resin together with an added specific inorganic additive undergoes the partial curing treatment at temperatures in the range of from a temperature just below the melting point of the starting resin down to a temperature lower by 80° C. than said melting point. The additive is selected from the group consisting of silica, hydrophobic silica, talc and calcium carbonate and mixtures thereof. By use of the additive, the powder characteristics or fluidity properties of the starting resin are substantially retained during and after the partial curing treatment, the static electricity generated by agitation of the resin during the treatment is significantly reduced, and the resin is effectively prevented from forming scaling on the interior walls of the reactor vessel used for the process. Therefore, the agitation of the powdery resin can be uniformly and efficiently effected so that a desired control of the melt viscosity is easily achieved.

5 Claims, No Drawings ing 4,918,134

PROCESS FOR PARTIALLY CURING POLYARYLENE SULFIDES

This is a continuation of application Ser. No. 125,417, filed Nov. 25, 1987, now abandoned.

FIELD OF THE INVENTION

This invention relates to a process for partially curing a powdery polyarylene sulfide resin and, in particular, to such a process which enables the polyarylene sulfide resin to possess improved powder characteristics during and after the curing treatment as compared those achieved in the conventional processes.

The present invention relates also to such a process during which the resin is effectively prevented from forming scaling on the interior walls of the reactor apparatus used for the process.

Polyarylene sulfide resins have attracted a great deal of commercial interest as materials which have the latent capacity to be used in manufacturing various articles such as electronic instruments and automobile instruments and parts, because of their excellent thermal and chemical resistance properties. They are moldable or shapeable to form various engineering plastic parts, films, sheets, fibers and other articles by use of any suitable molding technique such as injection, extrusion or press molding or the like. They have been employed in applications where thermal resistance is required.

PRIOR ART

Processes for preparing polyarylene sulfide resins are known and disclosed, for example, in U.S. Pat. Nos. 2,538,941; 3,274,165; 3,354,129; and 3,442,857.

The polymers produced by these known processes may exist in different states varying from viscous liquids to crystalline solids. In general, since the product polymers exhibit a relatively low melt viscosity, they have been successfully used only in a limited range of applications. For example, although they are advantageously used as a painting or coating material, they have a melt viscosity too low to be suitably used as materials that may be employed, for example, in injection or extrusion molding processes.

It has therefore been proposed that a polyarylene sulfide obtained by polymerization may be subjected to a partial curing treatment either in the presence or absence of oxygen so as to appropriately increase the melt viscosity up to a specific level depending on the particular application, for example injection or extrusion molding, in which the resin is to be used.

The preliminary curing processes known in the art may be roughly classified into two types; one in which the curing is effected at temperatures above the melting point of the polymer, and the other at temperatures below said melting point. In most cases, the curing is conducted at temperatures below the melting point of the polymer, because of the ease with which the melt viscosity can be controlled in such cases and because of the convenience of effecting curing in this way.

Where the curing is carried out at temperatures below the melting point of the polymer, any known apparatus such as a quartz tube reactor, metallic vessel provided with an agitator or a fluidized bed reactor may be used for the curing operation.

It is well known in the art that as the curing temperature increases, the curing rate of the polymer and thus the rate at which the melt viscosity increases are further enhanced.

In view of the above facts, it would be desirable to be able to conduct the partial curing treatment of polyarylene sulfide resin at a temperature as high as possible and yet below the melting point of the resin in order to achieve high productivity in the curing process. However, as a result of certain experimental investigations into the curing process, we have found that some undesirable phenomena occur in this process. For example, when the curing temperature is raised to a level approaching the melting point of the polymer, the powder characteristics or fluidity properties of the polymer become adversely affected and static electricity is generated to a significant extent. Due to these phenomena, it is difficult to control the melt viscosity such that it increases to a desired level because the powdery polymer cannot be agitated thoroughly and evenly in the curing apparatus and the resulting melt viscosity varies from one part of the reaction mass to another and also from one reaction mass to another reaction mass. Further, during the curing treatment, the powdry polymer tends to scale heavily on the interior walls of the curing vessel and, at the same time, the powdery polymer tends to form large agglomerates in the vessel. Further, there is an additional problem in that the bulk density of the powdery polymer tends to be lowered significantly during the curing treatment. In addition, the powder characteristics of the polymer are degraded to such an extent by the curing treatment that it is relatively difficult to handle the treated powdery polymer after curing treatment. On the other hand, if a lower curing temperature is employed to protect the initial powder characteristics from being degraded during the curing treatment, the melt viscosity will only increase to a very small extent.

BRIEF EXPLANATION OF THE INVENTION

An object of the present invention is to provide a process for partially curing a powdery polyarylene sulfide resin at temperatures below the melting point of the resin, which enables a controlled increase of the melting viscosity of the resin to be effected without difficulty, in which the powder characteristics of the powdery resin remain substantially unchanged during and after the process, and in which the resin is substantially prevented from forming into scaling on the curing apparatus.

Another object of the present invention is to provide powdery polyarylene sulfide resins which have melt viscosity properties suitable for use in various applications such as injection moldings, extrusion moldings, sheets, films, fibers and other articles and which comprise powder of a substantially uniform particle size and free from huge particle sizes, thus exhibiting good powder characteristics.

A further object of the present invention is to prevent the bulk density of the polymer from lowering to any substantial extent during the curing process and thereby to enable a relatively small-size curing apparatus to be employed for the curing process.

PREFERRED EMBODIMENTS OF THE INVENTION

The present invention relates to a process for partially curing a powdery polyarylene sulfide resin which comprises the steps of adding to the resin at least one member selected from the group consisting of silica, hydrophobic silica, talc and calcium carbonate and mixtures thereof and then curing the resin at temperatures in the range of a temperature just below the melting point of the resin down to a temperature lower by 80° C. than said melting point.

The polyarylene sulfide resins which may be used in the present invention are polymeric materials containing repeating units of the formula —R—S—, wherein R is an arylene group. Typical processes for preparing the resins are disclosed, for example, in U.S. Pat. Nos. 2,538,941; 3,274,165; 3,354,129; and 3,442,857.

An example of the resins which may be favorably used in the present invention is polyphenylene sulfide resin (PPS).

Examples of the curing apparatuses in which the present process may be conducted include known apparatuses such as a quartz tube reactor, a metallic reactor vessel provided with an agitator, and a fluidized bed reactor.

The types of additive that may be effectively used in the present invention include silica, hydrophobic silica, talc and calcium carbonate. In particular, silica and hydrophobic silica are highly effective in the present invention. These additives appear to become more effective so the particle size thereof becomes smaller and/or the bulk density thereof becomes lower.

The respective additives may be used singly or in any desired admixture thereof.

The amount of the additive incorporated in the powdery polymer resin may vary depending on the kind of additive adopted, the kind of polymer to be treated, the curing temperature and the duration of the curing period. Usually, the additive may be used in a proportion of 0.05–5.0 parts by weight for each 100 parts by weight of the polymer. When the additive is used in a proportion of less than 0.05 parts by weight on the above-defined basis, the powder characteristics of the polymer will become seriously degraded during and after the curing treatment and scaling of the polymer on the apparatus cannot be prevented effectively. Use of the additive in a proportion of greater than 5.0 parts by weight is not preferred, because in this case the mechanical strength properties of the products prepared from the so treated polymer may be so poor that the products can only be used in a restricted range of applications.

The additive may be introduced to the powdery polymer all at once, or in aliquots, or continuously.

Although the temperature at which the additive is added to the polymer is not critical, it is preferable to start the addition before the polymer reaches the curing temperature on account of the need to maintain the powder characteristics and prevent the scaling of the polymer during the curing treatment.

The curing temperature used in the present invention may range from a temperature just below the melting point of the polyarylene sulfide resin down to a temperature lower by 80° C., preferably by 10° to 70° C., than said melting point. The temperature to be used in the above range should be selected according to the kind of resin, the molecular weight thereof and the intended use of the cured resin.

The curing time is largely governed by the curing temperature and usually ranges from several minutes to several tens of hours. Preferably, a curing time of from 30 minutes to 10 hours is employed to attain a desired control of melt viscosity with an acceptable productivity rate.

According to the present invention, the polyarylene sulfide resins may be modified to possess a melt viscosity which is suitable for molding the resin by any appropriate molding technique, such as injection or extrusion technique, into any desired form of article, such as plate, sheet, film, fiber or other type of molded or shaped product.

A product resin that has been modified or partially cured according to the present invention has a substantially uniform particle size and exhibits good powder characteristics. If desired, the product polyarylene sulfide resin obtained according to the present invention may be blended with other polymers and with other additives such as a stabilizer, pigment powdery filler and fibrous filler.

EXAMPLE

The present invention will be further illustrated in more detail with reference to the following specific Examples, although it is not intended to limit the scope of the present invention to the Examples.

In the following Examples, the melt viscosity of the used polyphenylene sulfide resin was measured in a KOHKA type flow tester provided with a die (I.D. =0.5 mm, L =2 mm) at a temperature of 300° C. and a load of 10 kg.

The stirring and agitating state of the powdery polymer and scaling were visually assessed during the curing operation.

The powder characteristics of the polymer were determined using a powder tester (manufactured by HOSOKAWA-MICRON Co., Ltd.) during and after the curing treatment.

REFERENCE EXAMPLE 1

This example illustrates a process for preparing polyphenylene sulfide (referred to as "PPS" hereinafter) which was used in the following Examples.

A reactor vessel (with a volume capacity of 530 l) provided with an agitator, a dehydration tower and a heating jacket was charged with 110 l of N-methyl pyrrolidone and 61.1 kg of sodium sulfide (purity =60.2% by weight $Na_2S$). The contents of the reactor were stirred and heated up to an internal temperature of about 200° C. by means of the jacket, while removing the generated water through the dehydration tower, which distilled out 13.5 l of a fraction essentially comprising water.

Then, 70.0 kg of p-dichlorobenzene and 48 l of N-methyl pyrrolidone were added to the reaction mixture which was then heated to a temperature of 250° C. over a period of time of one hour and 20 minutes and allowed to react at 250° C. for a further 3 hours when the pressure rose to 10.5 $kg/cm^2$.

After completion of the reaction, the reaction mixture was passed to a solvent recovery unit provided with a stirrer, a heating jacket and a vacuum line. To the reaction mixture, an additional amount (30 l) of N-methyl pyrrolidone was added. Then the reaction mixture was heated under a reduced pressure to distill 210 % of a fraction essentially comprising N-methyl pyrrolidone.

To the residue, 200 l of water was added to form an aqueous slurry which was then heated at 80° C. for 15 minutes while stirring. The slurry was passed to a centrifugal separator from which the product polymer was recovered.

Thereafter, the resulting polymer was returned to the solvent recovery unit, to which 200 l of water was added. The aqueous mixture was heated at 100° C. for 30 minutes while stirring and then cooled and passed to the centrifugal separator to recover the polymer powder. This procedure was repeated twice.

Thereafter, the polymer was passed into a jacketed ribbon blender and dried to give 47.5 kg of PPS. The melting point of the polymer was found to be 278° C. using a differential scanning calorimeter at a heating rate of 10° C./min.

The melt viscosity of the polymer was 27 Pa·S.

The powder characteristics of the polymer were determined using the powder tester. The results were as follows:

| | |
|---|---|
| angle of rest | 41° |
| bulk density (loose) | 0.39 g/cm$^3$ |

As a measure of the particle size of the polymer, when the polymer was classified with a 7 mesh sieve, a fraction of 0.07% by weight was left on the sieve.

COMPARATIVE EXAMPLE 1

Into a jaketed ribbon blender with a volume capacity of 15 l, 3 kg of PPS was charged and heated with agitating under an air stream. When the interior temperature reached about 250° C., the state of the polymer under stirring was visually observed. The polymer appeared to be in a state of being swollen. The polymer particles were attracted massively to the rotating blades of the agitator. These conditions showed clearly that the degree of agitation was insufficient. A sample of the polymer was taken out of the rotating blender. While the sample was still hot, the bulk density (loose) thereof was measured. It was found that the bulk density had been reduced to a remarkable extent down to as low as 0.21 g/cm$^3$. The level of static electricity of the polymer under stirring was found to be $-4$ KV.

Without interruption of the operation, the polymer was further cured at 250° C. while observation of the contents was continued. The state of agitation became worse and worse. The level of static electricity rose to $-6$ KV.

After 4 hours of curing at 250° C. the ribbon blender was cooled and then the treated polymer was withdrawn from the bottom of the blender. The interior walls of the ribbon blender were heavily scaled with the polymer.

The resulting PPS powder showed a melt viscosity of 280 Pa·S, an angle of rest of 41° and a bulk density (loose) of 0.40 g/cm$^3$. When classified with a 7 mesh sieve, a fraction of 2.8% by weight of the polymer was left on the sieve.

A sample of the PPS was mixed with 40% by weight of glass fibers and molded into a test plate which showed a flexural strength of 240 MPa as measured in accordance with the test method ASTM D790.

EXAMPLE 1

The procedure as described in the preceding Comparative Example 1 was repeated except that 6.0 g of silica (E-220A prepared by Nippon Silica Co., Ltd.) was added in the ribbon blender when the interior temperature had reached 250° C.

Within a few minutes, the state of agitation of the powdery polymer turned from bad to good. The polymer powder did not adhere to the rotating blades of the blender to any substantial extent. A sample of the polymer taken out of the blender showed a bulk density (loose) of 0.35 g/cm$^3$, which value was higher than that of the additive-free polymer of the preceding Comparative Example. During the curing operation, a level of static electricity of $-2$ KV was observed, which value was lower than that observed in the Comparative Example.

Scaling of the polymer on the interior walls of the ribbon blender occurred to a lesser extent than in the case of the additive-free polymer.

The resulting powdery polymer showed a melt viscosity of 250 Pa·S, an angle of rest of 37° and a bulk density (loose) of 0.43 g/cm$^3$. When classified with a 7-mesh sieve, a fraction of 1.4% by weight of the polymer was retained on the sieve.

The flexural strength was 242 MPa.

EXAMPLE 2

The procedure of Example 1 was repeated except that 18.0 g of talc (MICROACE L-1 prepared by Nippon Talc Co., Ltd.) was used in place of the silica.

The state of agitation of the powdery polymer during the curing operation was improved as compared with that observed with the additive-free polymer in the Comparative Example 1.

A bulk density of 0.25 g/cm$^3$ was observed during the curing operation.

Scaling of the polymer on the interior walls of the ribbon blender was reduced to an extent as low as that observed with the silica-loaded polymer (Example 1) as compared with the case where the additive-free polymer was used (Comparative Example 1).

The resulting powdery polymer showed a melt viscosity of 360 Pa·S, an angle of rest of 39° and a bulk density (loose) of 0.42 g/cm$^3$.

The flexural strength was 244 MPa.

EXAMPLE 3

The procedure of Example 1 was repeated except that 24.0 g of calcium carbonate (WHITONE P-10 prepared by Shiraishi Kogyo Co., Ltd.) was used in place of the silica.

The state of agitation of the powdery polymer during the curing operation was improved as compared with that observed with the additive-free polymer. The bulk density of the polymer observed during the curing operation was 0.25 g/cm$^3$, which was higher than that of the additive-free polymer. Scaling occurred to a reduced extent.

The resulting powdery polymer showed a melt viscosity of 290 Pa·S, an angle of rest of 39° and a bulk density of 0.41 g/cm$^3$.

The flexural strength was 246 MPa.

EXAMPLE 4

The procedure of Example 1 was repeated except that 6.0 g of a hydrophobic silica (SS-20 prepared by Nippon Silica Co., Ltd.) was used in place of the silica.

The agitation of the polymer was conducted in a good condition during the curing operation. The bulk density observed during the operation was 0.33 g/cm$^3$. Scaling occurred to a reduced extent.

The resulting powdery polymer showed a melting viscosity of 220 Pa·S, an angle of rest of 36° and a bulk density of 0.41 g/cm$^3$.

The flexural strength was 240 MPa.

EXAMPLE 5

The procedure of Example 1 was repeated except that 9.0 g of a hydrophobic silica (R-972 prepared by Nippon Aerosil Co., Ltd.) was used in place of the silica.

The agitation of the polymer was conducted in a good condition during the curing operation. A bulk density of 0.31 g/cm$^3$ was observed during the curing operation. Scaling of the polymer occurred to a reduced extent.

The resulting powdery polymer showed a melt viscosity of 260 Pa·S, an angle of rest of 37° and a bulk density of 0.42 g/cm$^3$.

The flexural strength was 240 MPa.

COMPARATIVE EXAMPLE 2

The procedure of Example 1 was repeated except that 15.0 g of titanium dioxide (A-100 prepared by Ishihara Sangyo Co., Ltd.) was used in place of the silica.

The state of agitation during the curing operation and the extent of scaling of the polymer on the apparatus were not significantly improved as compared with the case where the additive-free polymer was used.

The resulting polymer showed a melt viscosity of 220 Pa·S, an angle of rest of 38° and a bulk density of 0.41 g/cm$^3$.

The flexural strength was found to be at a substantially reduced level of as low as 200 PMa.

Where the results of Examples 1-5 are compared with the results of Comparative Example 1, it is clearly exhibited that the addition of silica, talc, calcium carbonate or hydrophobic silioa improves the state of agitation, the extent of scaling and the bulk density of the polymer undergoing the curing operation in comparison with the case wherein no additive is employed.

Further, it is shown that the powder characteristics of the polymers obtained in Examples 1-5 are improved as compared with those of Comparative Example 1 and that the flexural strengths of the polymers of Examples 1-5 loaded with 40% by weight of glass fibers are not less than that achieved in Comparative Example 1.

Where titanium oxide is used as in Comparative Example 2, this material gives rise to no appreciable improvement in the state of agitation of the polymer and results in a seriously reduced level of flexural strength.

EXAMPLES 6-9 AND COMPARATIVE EXAMPLE 3

The general procedure of Example 1 was repeated using various levels of silioa (E-220A prepared by Nippon Silica Co., Ltd.) and hydrophobic silica (SS-20 prepared by Nippon Silica Co., Ltd.) to investigate the effects of the temperature at which the additive was added to the polymer and of the level of additive used on the process and the product.

The results are summarized in Table 1.

From the results of the preceding Examples and Table 1, it is seen that better results may be achieved by adding an additive such as silica to the polymer at temperatures lower than the temperature (around 220° C.) above which the state of agitation becomes adversely affected, as well as that above which the polymer particles will begin to adhere massively to the rotating blades of the stirrer.

Although, addition of the additive at levels of lower than 0.05 parts per 100 parts of polymer results in no appreciable improvement in the state of agitation, the extent of scaling of the polymer and the post-cure powder characteristics, it is apparent that as the level of additive is increased, the improvements become significant.

TABLE 1

|  | Example 6 | Example 7 | Example 8 | Example 9 | Comparative Example 3 |
| --- | --- | --- | --- | --- | --- |
| PPS (parts by weight) | 100 | 100 | 100 | 100 | 100 |
| Additive (parts by weight) | E-220A 0.2 | E-220A 0.4 | E-220A 0.6 | SS-20 0.4 | E-220A 0.02 |
| Addition temperature[1] (°C.) | 200 | 200 | 200 | 200 | 200 |
| Curing condition (°C. × hr) | 250 × 2.5 | 250 × 2.5 | 250 × 2.5 | 250 × 2.5 | 250 × 2.5 |
| State of agitation[2] | O | O | ⊙ | ⊙ | X |
| Scaling[2] | O | ⊙ | ⊙ | ⊙ | X |
| Melt viscosity after curing (Pa.S) | 320 | 270 | 220 | 280 | 300 |
| Powder characteristics after curing |  |  |  |  |  |
| Angle of rest (°) | 38 | 37 | 35 | 33 | 40 |
| Bulk density (g/cm$^3$) | 0.40 | 0.41 | 0.41 | 0.41 | 0.40 |
| Fraction left on 7-mesh sieve (wt %) | 1.8 | 1.4 | 0.7 | 0.5 | 2.6 |
| Flexural strength (MPa) | 240 | 240 | 240 | 245 | 245 |

[1]A temperature encountered when the polymer was being heated up to the curing temperature 250° C.
[2]Visually assessed: ⊙... excellent; O ... acceptable; X ... unacceptable As hereinbefore illustrated, according to the present invention, powdery polyarylene sulfide resins may be cured to a desirable level of melt viscosity prior to use in particular molding process. During and after the curing process, the powder characteristics of the resins do not vary to such a serious extent that the curing operation and the handling of the polymers are significantly affected. During the curing operation, scaling of the polymers on the curing apparatus is effectively prevented.

Therefore, the agitation of the polymer in the curing stage may be carried out effectively to readily achieve control of the melt viscosity of the polymers.

Further, since the bulk density of the polymers is not reduced significantly in the present process, the present invention may be effected in a relatively small apparatus.

What is claimed is:

1. A process for preparing a partially cured powdery polyarylene sulfide resin prior to molding said resin or applying said resin to a substrate, which comprises the steps of adding to a powdery, uncured virgin polyarylene sulfide resin at least one additive selected from the group consisting of non-hydrophobic silica and hydrophobic silica and mixtures thereof in a proportion of 0.05–0.6 parts by weight per 100 parts by weight of the resin and then heating and mixing the resin at temperatures in the range of a temperature just below the melting point of the resin down to a temperature lower by 80° C. than said melting point so as to partially cure the resin and increase the melt viscosity thereof to a level suitable for use in molding.

2. A process according to claim 1, wherein the resin is polyphenylene sulfide.

3. A process according to claim 1, wherein the curing temperature ranges from a temperature just below the melting point down to a temperature lower by 10°–70° C. than the melting point.

4. A process according to claim 2, wherein the curing temperature ranges from a temperature just below the melting point down to a temperature lower by 10°–70° C. than the melting point.

5. A process according to claim 1, wherein the heating time ranges from 30 minutes to 10 hours.

* * * * *